UNITED STATES PATENT OFFICE.

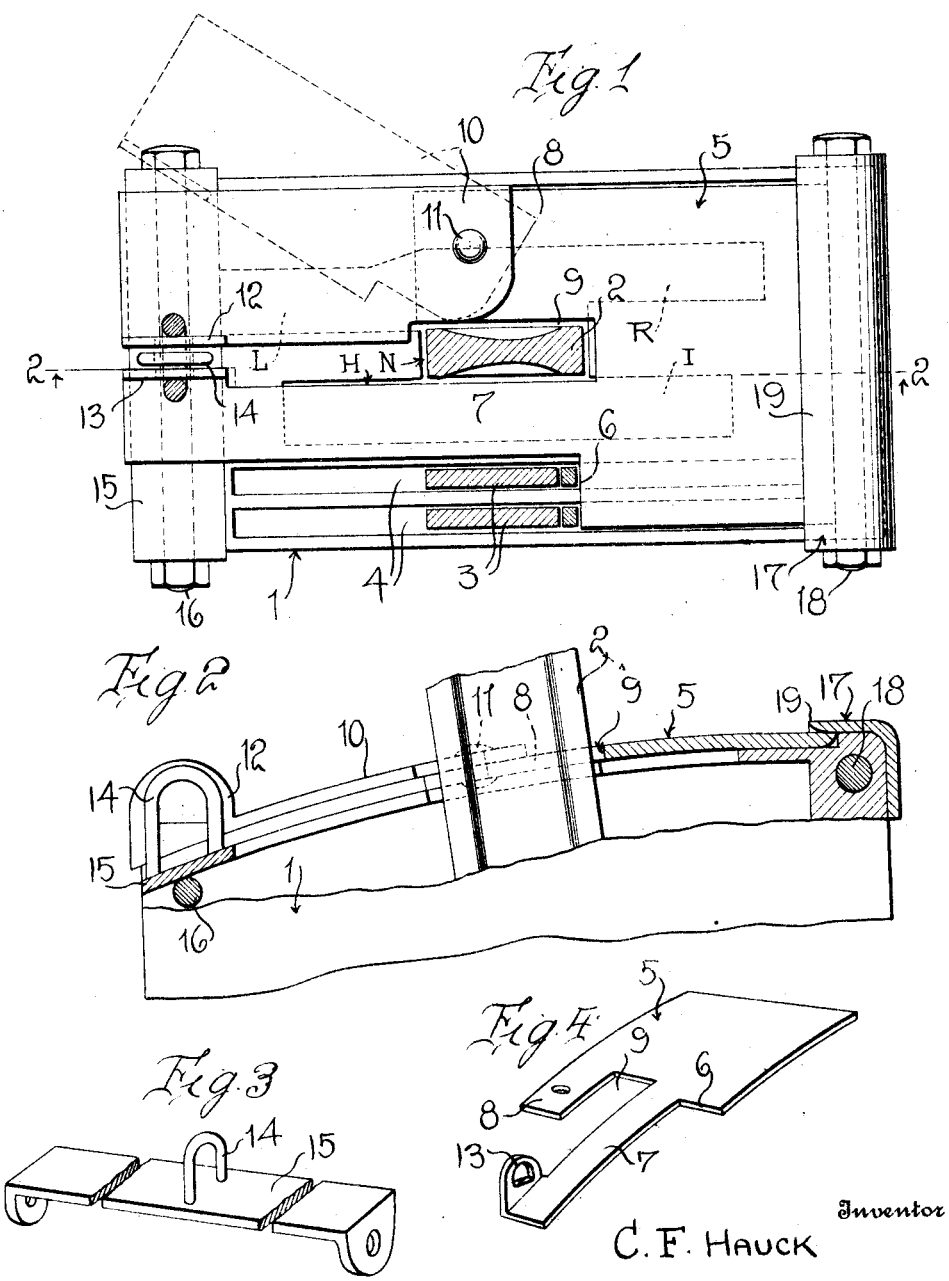

CHARLES F. HAUCK, OF BOULDER, COLORADO.

AUTOMOBILE-LOCKING DEVICE.

1,198,843.      Specification of Letters Patent.      Patented Sept. 19, 1916.

Application filed December 6, 1915. Serial No. 65,335.

*To all whom it may concern:*

Be it known that I, CHARLES F. HAUCK, a citizen of the United States, residing at Boulder, in the county of Boulder and State of Colorado, have invented certain new and useful Improvements in Automobile-Locking Devices, of which the following is a specification, reference being had to the accompanying drawings.

This invention comprehends certain new and useful improvements in automobile attachments or accessories, and relates particularly to a device for locking the gear shifting lever in "neutral" position and also the brake lever in its farthest "applied" position, whereby it will be impossible to start the car with the engine, or to move it away by pushing or towing it, all liability of the car being stolen or used in any way by unauthorized parties, being thereby precluded.

The invention has for its primary object a durable and efficient construction of device of this character which may be cheaply manufactured and not liable to get out of order and which will be capable of being readily applied to the vehicle, when required, and very easily detached therefrom by the owner or other authorized party, and which will not require any material changes in the gear changing quadrant or case or interfere in any way with the operation of the gear shifting and brake levers when these are desired for use. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which, Figure 1 is a top plan view of the gear shifting quadrant of an automobile with my locking device applied thereto, Fig. 2 is a longitudinal sectional view, the section being taken approximately on the line 2—2 of Fig. 1, Fig. 3 is a detail perspective view of one of the bars employed and hereinafter specifically referred to, and Fig. 4 is a similar view of the plate which forms the main part of the locking device.

Corresponding and like parts are referred to in the following description and designated in all of the views of the accompanying drawing by like reference characters.

Referring to the drawing, the numeral 1 designates the gear changing frame or quadrant of an automobile formed with longitudinally disposed slots L, I, H and R, for receiving the gear shifting lever 2 to shift the gears into the low, intermediate, high and reverse positions, said slots being joined by the neutral opening N, as customary; and 3 designates the brake lever which is movable through a guide slot or slots 4 formed in the quadrant 1 at one side of the latter.

My improved locking device includes a plate 5 which is adapted to extend over a portion of the upper face of the quadrant 1 so as to cover the intermediate and reverse slots I and R, as shown, said plate being formed at one side with a transversely extending shoulder 6, with which the brake lever 3 is adapted to abut when said lever is in its fully drawn-back position, so as to tightly and securely apply the brakes. The plate 5 is formed contiguous to the shoulder 6, with a longitudinally extending arm 7, and it is also formed at its opposite side and spaced from the arm 7, with another, but shorter, arm 8, the arm 7 being designed to extend over and close the slot H and the arm 8 being designed to extend over and close part of the slot L. The arms 7 and 8 are designed to embrace a gear shifting lever 2 and the space which is formed between said arms forms an opening 9 for the accommodation of said lever, said opening being preferably substantially co-extensive with the slot or opening N hereinbefore referred to.

A finger 10 in the form of a plate, as shown, overlaps the arm 8 at one end thereof, and is pivotally connected thereto by a rivet 11 or similar fastening device, whereby the finger 10 may swing horizontally, *i. e.*, laterally in a plane substantially coincident with or parallel to the plane of the arms 7 and 8, and the remaining portion of the plate 5. The finger 10 is formed on its inner side and at its relatively free end with an upstanding eye 12 and the arm 7 is correspondingly formed with an upstanding eye 13, said eyes in the applied position of the parts, being disposed on opposite sides of an upstanding keeper 14 in the form of a staple which may be formed on or secured to the quadrant 1 in any desired way, or secured to or formed in any desired way upon a transversely extending bar 15 which is intended to be applied to the upper face of the quadrant at one end thereof, said bar having down-turned ends, as shown, and said ends being apertured to receive a bolt 16 which may be the ordinary bolt at this end of the quadrant, although preferably of slightly greater length than the ordinary bolt so as to accommodate the ends of the bar.

At the other end of the quadrant 1, a transversely extending bar 17 is disposed, said bar being held in place upon the quadrant preferably by a bolt 18 corresponding to the bolt 16, and the bar 17 being preferably raised somewhat above the upper surface of the quadrant, so as to form a transversely extending flange 19 underneath which one edge of the plate 5 may be slipped, as clearly illustrated in the drawings.

From the foregoing description, in connection with the accompanying drawing, the operation of my improved locking device for automobiles will be apparent. In the practical use of the device, the quadrant 1 is equipped with the bars 15 and 17 or the equivalents thereof, some means being provided whereby there is a flange or similar device at one end of the quadrant to receive one edge of the plate 5, and a staple or other keeper 14 at the other end of the quadrant to co-act with the eyes 12 and 13 hereinbefore referred to. To apply the device, the gear shifting lever 2 is moved into neutral position and the brake lever 3 is drawn back to a position where it will hold the brakes fully applied. The plate 5 is then slipped at one end underneath the flange 19 of the bar 17, and swung downward whereby the shoulder 6 will engage the brake lever 3 and the arms 7 and 8 embrace and hold the gear shifting lever 2 from being moved from neutral position into any other position. As the plate is slipped downward, it is manifest that it can be thrust slightly farther underneath the flange 19 and thus be securely held in place at that end, and the finger 10 is then swung around to its operative position over the slot L whereupon the bow of a hasp or padlock is inserted through the eyes 12 and 13, and the interposed staple 14 and locked, whereupon the locking device will be securely held in position and all attempts to start the car through the instrumentality of the engine or to move it by either pushing or towing it will be frustrated. At the same time the device may be very easily and quickly removed from applied position by anyone equipped with the proper key to fit the padlock and thus, as will be seen, I have provided a very efficient and durable device which may be readily applied to an automobile or the like, for the purposes hereinbefore set forth, and which may be very clearly detached when not desired for use.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined in the appended claims.

What is claimed, is:

1. The combination with a gear changing slotted quadrant having a flange overlying an end portion thereof and a gear changing lever and brake lever working therethrough, of a plate applicable to said quadrant and adapted to close some of the slots thereof, said plate having one end adapted to extend beneath the flange, the plate being formed with arms designed to embrace the gear shifting lever, one of said arms extending to the opposite end of the quadrant, a laterally movable finger carried by the other arm of said plate and adapted with the first mentioned arm to close other slots in the quadrant, and means whereby the first named arm and said finger may be detachably secured to the quadrant.

2. The combination with a slotted automobile quadrant, of a bar connected to one end thereof and producing a flange, a plate applicable to said quadrant and adapted to have one end extended underneath said flange and to cover a portion of the slots of the quadrant, said plate being formed with arms adapted to embrace the gear shifting lever and one of said arms being provided with a laterally swinging finger which, with the other arm, is adapted to close the remaining portion of the slotted surface of the quadrant, whereby it will hold the gear shifting lever in neutral position, and means for detachably connecting said finger and said other arm to the other end of the quadrant.

In testimony whereof I hereunto affix my signature in the presence of two witnesses.

CHARLES F. HAUCK.

Witnesses:
S. C. GORSUCH,
HERBERT DIVOLL.